Aug. 7, 1934.  A. G. FITZ GERALD  1,969,400
PUNCTURE SEALING INNER TUBE
Filed March 15, 1934
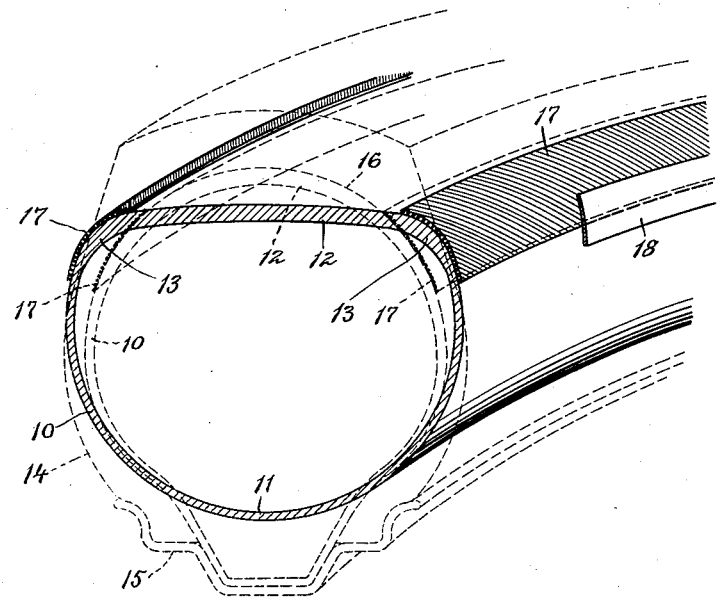
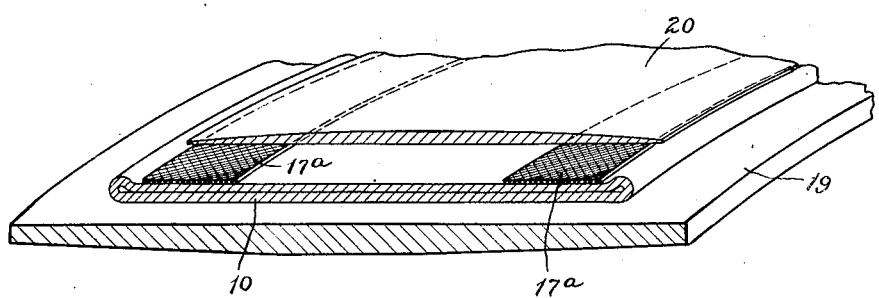
Inventor,
A. G. Fitz Gerald,
By Robert M. Pierson,
Attorney Patented Aug. 7, 1934

1,969,400

UNITED STATES PATENT OFFICE 1,969,400

PUNCTURE-SEALING INNER TUBE

Arthur G. Fitz Gerald, West Newton, Mass.

Application March 15, 1934, Serial No. 715,619

3 Claims. (Cl. 152—13)

This invention relates to puncture-sealing pneumatic tire tubes of the specific compression-tread type disclosed in my prior Patent 1,737,368 of Nov. 26, 1929, having a normally-unstressed, transversely-flattened tread wall of less than its ultimate inflated circumference, a belly wall or inner periphery of greater than its ultimate inflated circumference, and shoulders extending beyond the ultimate inflated outline and adapted to place the tread wall under transverse compression by contraction of said shoulders when the tube is inflated against the casing.

Such tubes, particularly when provided with a restrictive fabric band on the outer side of the tread wall, will retain the air pressure against diffusion through the tube wall to a greater extent than ordinary inner tubes and will, when punctured by a nail or similar object, seal the puncture so that the tire will run for a long time without going flat while the nail remains therein, and often will retain a serviceable air pressure for a substantial time even if the nail is removed. But when the puncturing object is removed, it is generally desirable to repair the tube and if its tread surface is covered with a fabric band, difficulty is experienced in obtaining an air-tight repair unless the hole under the patch is first plugged with unvulcanized rubber, which the average repairer will generally neglect to do, or the fabric around the hole is removed.

It is the principal object of my present invention to provide a compression-tread tube of the described type which can be more readily repaired with the ordinary cemented or vulcanized outer patch. To that end, I have provided a novel construction and arrangement of restrictive elements incorporated with the tube wall, which retain the tread wall under compression but leave it unrestricted between said elements and well adapted for the reception of repair patches.

Of the accompanying drawing, Fig. 1 is a cross-sectional perspective view showing a short segment of an inner tube constructed according to my invention, in its natural or molded shape, in full lines, together with the tire casing and the tube in its inflated condition, shown in broken lines.

Fig. 2 is a similar view showing a step in one mode of manufacture of such a tube on a pulley, with restrictive bands and tread rubber of modified construction incorporated therein.

Referring at first to Fig. 1, my improved tube 10 is made of vulcanized, soft-rubber composition, with a belly wall 11 and side walls of ordinary thickness and a tread wall 12 which may be of somewhat increased thickness, as shown, to provide the desired puncture-sealing effect, although in tubes for high speed vehicles it is desirable to avoid too thick a tread wall in order to keep the tire from overheating, and said wall may even have no increased thickness. The margins of the thickened tread wall here illustrated taper gradually into the side walls at the shoulders 13.

Fig. 1, in full lines, represents the preferred shape of the tube in its natural or molded form and shows it approximately in the preferred relation to the shape and relative dimensions of a tire casing 14 in which said tube is intended to be used, the casing being shown in broken lines and mounted on a rim 15 of the drop-center or well-base type. It will be observed that the tread wall 12 of the tube is transversely flattened or approximately flat and of slightly smaller circumferential length than that of its seat in the casing cavity 16, its shoulders 13 are curved more sharply or on shorter radii than that of the circle of said cavity, and said shoulders extend considerably outside of what will be the ultimate outline of the tube when inflated against the casing, while the belly wall or inner periphery 11 is of greater circumferential length than its seat in the base of the cavity formed by the casing and rim. The belly and side walls are shown as molded substantially in the arc of a circle, although some modified initial shape for this portion of the tube, adaptable to the molding and operating requirements, might be adopted.

The cross-sectional circumference of the tube may be slightly less, of the order of 4 or 5%, than that of the casing and rim cavity for the smallest tire casing in which the tube is to be used, but the same tube, without substantial loss of self-sealing properties, may be used in oversize casings of considerably larger cavities. In common with the tube of my aforesaid prior patent, this tube is well adapted to be made rightside out in endless form and vulcanized in a mold to the shape illustrated in Fig. 1, and hence can be produced at a much lower cost than compression-tread tubes which are vulcanized inside out on a mandrel, reversed and the ends spliced together, besides which the tube can be properly inserted in a tire casing with greater ease.

When a tube of the described shape is to be installed, it is first distended with a light air pressure nearly to circular cross-sectional form, then inserted in the casing 14, the tire beads applied to the rim and the tube inflated to service pressure. The inflation draws down the belly wall 11 into the space between the tire beads and against the rim base and contracts the circumference thereof. The middle of the tread wall 12 is expanded in circumference and pushed out against the casing and the shoulders 13 are drawn in or contracted toward each other and at the same time flattened out to a smaller curvature, which places the tread-wall rubber under transverse compression even when no fabric is present as a restraining element, thereby lessening diffusion of air pressure through the tread wall and imparting puncture-sealing properties as compared with a tube of stretched rubber. But, since rubber under compression or tension will take more or less of a permanent set after the lapse of time, it has been customary, as in the disclosure of my aforesaid prior patent as well as in most compression-tread tubes of other types, to provide the tread wall with a reinforcing or restraining band of rubberized fabric vulcanized therein or thereon, the use of which in a tube molded with a flattened tread wall furthermore reduces the required thickness of the tread-wall rubber. When said fabric band lies on the outer side of the tread wall and covers the middle region thereof, it interferes with the airtight repairing of said wall with the ordinary adhesive rubber patch as above pointed out.

In accordance with my present invention, the middle region of the tread wall 12 of the tube, where punctures are most likely to occur, is left unrestrained or freely stretchable and contractible in all directions, but at the margins of the middle zone, preferably over the shoulders 13, I provide the tube with a pair of endless, circumferential restraining bands 17, which may be rubberized fabric of any suitable type, square-woven or so-called thread or cord fabric of either the weftless or weak-wefted variety and preferably bias-cut so that the threads extend diagonally. In the illustration of Fig. 1, the strips 17 each comprise a single layer of thread fabric, and the two are laid with their threads extending diagonally in opposite directions, but considerable variation is allowable both as to the type of fabric and the direction of its threads. The bias-laid threads permit some contraction and extension of the tube wall both longitudinally and transversely of the latter. The relative width and placing of these bands, when located in the general region indicated, is subject to some variation. In the unvulcanized tube, after the rubberized fabric strips 17 have been applied, they may be more or less overlaid at either or both edges with circumferentially-extending thin strip rubber, such as the outer edge strip 18 shown in Fig. 1, to embed the edges of the fabric strip and improve the appearance.

When the tube 10 is blown up in the tire casing 14, and to some extent when it is lightly distended prior to insertion therein, the restraining strips 17 move laterally inward with the shoulders 13 toward each other, they flatten out with said shoulders to a smaller curvature, so that the width of the bands projected on the circle of the tire cavity 16 is somewhat increased as indicated by their broken-line position in Fig. 1, and, since the rubber underneath the bands is restrained by the threads against substantial stretching along the cross-sectional circumference of the tube, these bands participate and aid in placing the rubber of the tread wall 12 under lateral compression when its middle portion is distended outwardly against the casing. The bands, at their shorter or inner margins, are also generally somewhat shortened longitudinally thereof. Thereafter, during operation of the tire, and aided by reaction or confinement of the reinforced shoulders against the casing, the shoulders or portions reinforced with the restraining bands 17 offer a resistance in the nature of a permanent footing for the two ends of the tread-rubber arch, against inward travel of the shoulder portions inwardly along the casing toward the rim, and hence tend to retain the transverse compression of the tread rubber and overcome its tendency to assume a permanent set.

From the foregoing, it will be evident that the restraining strips 17 perform new and different functions as compared with the fabric tread strip of my aforesaid prior patent and others previously employed in compression tubes, they permit the tread-wall rubber between them to assume additional compression because not restrained by overlying fabric, and the absence of fabric in the middle of the tread wall permits the air-tight repair of punctures in said portion with the ordinary external rubber patch.

This tube may be manufactured by any suitable method, as by extruding its raw body from a tube machine, cutting to length and joining the ends, followed by vulcanization to the described shape in a mold. In that case the bands 11 might be guided into their proper locations on the rubber as the latter issues from the tube-machine die.

In the modification illustrated in Fig. 2, which shows the partially formed tube 10 in flattened condition, with its outer and inner peripheries in contact, and laid on a drum or pulley 19 for the application of the restraining fabric strips, such strips 17a are shown as of bias-cut, square-woven fabric, and both of said fabric strips, as well as the outwardly-adjacent portions of the tube wall and the middle portion of the tread wall between the strips, are overlaid with a single covering strip 20 of raw rubber composition, which may have considerable thickness in the middle portion thereof so as to add substantially to the thickness of the tread-wall rubber which is placed under compression when the tube is in use and may taper in the margins thereof to a smaller thickness over the fabric strips 17a and substantially to feather edges where said margins overlap onto the wall of the tube 10 beyond the fabric strips. In this construction, said fabric strips may be first assembled at the proper spacing upon the rubber strip 20 and adhered thereon, as by rolling, and the composite strip then applied upon the body of the tube 10 on the pulley 19, its ends joined and securely adhered thereto by stitching or rolling down, after which the tube may be removed from the pulley and subjected to vulcanization, which integrally unites all of the members.

It will be understood that other modifications of embodiment may be made within the scope of my invention as defined in the claims.

I claim:

1. A self-sealing, compression-tread, vulcanized rubber, endless pneumatic tube having a longitudinally-contractible belly and a substantially-flat unstressed tread wall with contractible shoulders extending beyond the ultimate inflated outline, the tube wall having restrictive bands incorporated therewith at the shoulders and being unrestricted between said bands.

2. A vulcanized rubber, pneumatic-tire inner tube having a longitudinally-contractible belly and a transversely-flattened tread wall with shoulders extending beyond the ultimate inflated outline and having vulcanized to the outer sides thereof a pair of circumferential restrictive bands of bias threads for maintaining the tread wall under compression when the tube is inflated in the casing, the tread wall being unrestricted between said bands.

3. In a pneumatic tire, the combination of a tire casing and an inner tube therein having, when uninflated outside the casing, a substantially-flat, unstressed tread wall and an inner periphery, respectively of smaller and larger circumferences than their seats in the casing, shoulders which would extend beyond the ultimate inflated outline and having incorporated therewith a pair of separate, circumferential, restrictive bands which coact with the casing to maintain the tread wall under compression when said wall has, by inflation, been placed under compression.

ARTHUR G. FITZ GERALD.